United States Patent [19]

Kamp et al.

[11] Patent Number: 5,321,341
[45] Date of Patent: Jun. 14, 1994

[54] DRIVE MODULE FOR MACHINE

[75] Inventors: Wim Kamp, Scotch Plains; Leonard Buys, East Brunswick, both of N.J.

[73] Assignee: Captive Plastics, Inc., Piscataway, N.J.

[21] Appl. No.: 77,338

[22] Filed: Jun. 15, 1993

[51] Int. Cl.⁵ .............................. H02P 7/10
[52] U.S. Cl. ........................ 318/9; 318/560; 425/533; 425/577; 264/538
[58] Field of Search .............. 318/3, 9, 10-11, 318/14, 560, 561, 646; 425/522, 540, 532-539, 533, 542, 547-552, 577, 589, 135, 145, 150, 183; 264/526-538, 523

[56] References Cited

U.S. PATENT DOCUMENTS

| | | | |
|---|---|---|---|
| 3,881,854 | 5/1975 | Rainville | 425/242 B |
| 3,887,316 | 6/1975 | Hestehave | 425/242 B |
| 4,162,879 | 7/1979 | Makowski | 425/183 |
| 4,540,359 | 9/1985 | Yamazaki | 425/135 |
| 4,540,543 | 9/1985 | Thomas et al. | 425/525 X |
| 4,604,258 | 8/1986 | Valyi | 425/533 X |
| 4,801,260 | 1/1989 | Oles et al. | 425/527 |
| 4,841,211 | 6/1989 | Neko | 318/560 X |
| 4,877,388 | 10/1989 | Inaba et al. | 318/625 X |
| 4,941,815 | 7/1990 | Julian | 425/525 |
| 4,941,816 | 7/1990 | Aoki et al. | 425/533 |
| 4,946,367 | 8/1990 | Nakamura | 425/526 |
| 4,988,273 | 1/1991 | Faig et al. | 318/254 X |
| 5,261,810 | 11/1993 | Kamp et al. | 425/590 X |

*Primary Examiner*—William M. Shoop, Jr.
*Assistant Examiner*—David Martin
*Attorney, Agent, or Firm*—Caesar, Rivise, Bernstein, Cohen, & Pokotilow, Ltd.

[57] ABSTRACT

A drive module of a machine having a turret adjacent the upper end and a motor adjacent the lower end. The turret is driven by the motor to move between different stations of the machine by the controlled rotation of the turret about an axis of rotation. The motor includes an upwardly directed output shaft which is in generally axial alignment with the axis of rotation of the turret. An outer housing is disposed between the turret and motor, and the output shaft of the motor is connected to an inner housing disposed for rotation within the outer housing. An elongate shaft extends axially through the inner housing and is connected with the turret to transmit movement of the shaft to the turret. A force transmitting member is connected to the inner housing and to the elongate shaft for transmitting rotational movement of the inner housing to the elongate shaft, and for permitting axial movement of the elongate shaft relative to the force transmitting member and the inner housing. The module includes connection means for attachment to a horizontal frame member of the machine.

11 Claims, 3 Drawing Sheets

DRIVE MODULE FOR MACHINE

BACKGROUND OF THE INVENTION

This invention relates generally to a drive system for a machine; and more specifically to an index drive system for a molding machine; and still more specifically to an index drive module employing a servomotor-driven turret, preferably for use in moving molding elements, such as core rods, into different operating stations of the molding machine.

In prior art molding machines, such as injection-blow molding machines, a turret carrying core rods or other machine elements is mounted to a supporting frame or table for both axial and rotational movement relative to the frame or table. In a representative prior art injection-blow molding machine a plurality of core rods carried by the turret are first positioned within multiple cavities of an injection mold in an injection molding station. In this station extruded plastic material is injected into the mold cavities, to thereby form a parison on each of the core rods. Thereafter, the multi-cavity mold in the injection molding station, as well as a multi-cavity mold in a downstream blow molding station are opened, and the turret is rotated to direct the core rods with the parisons thereon into the blow molding station. In order to accomplish this function, it is necessary to first axially lift or raise the turret, to thereby move the core rods into an uninterrupted free space between the mold sections of the open, multi-cavity injection mold, and thereafter index the turret, while it is in its raised position, to move the core rods into an uninterrupted free space between the mold sections of the open, multi-cavity blow mold in the blow molding station. Thereafter the blow mold is closed, and the turret is axially lowered to position the core rods with the parisons thereon into the proper position within the cavities of the closed blow mold. Then pressurized gas is directed into the parisons through openings in the periphery of the core rods, to expand each of the parisons into engagement with the surfaces of a corresponding mold cavity, and thereby form each parison into the desired shape of the article to be molded.

After the product has been molded into its desired shape in the blow molding station, the multi-cavity blow mold is opened, the turret carrying the completed articles is then raised into the uninterrupted free space between the mold sections of the open blow mold, and the turret is again indexed to a final stripping station, at which the completed product is cooled and removed from the core rods for subsequent packaging.

From the above description, it should be apparent that the turret carrying the core rods needs to be axially moveable both to properly position the core rods within the closed injection and blow molds during the respective injection and blow molding operations, and to properly position the core rods into the uninterrupted free space between the open mold sections of the injection and blow molds, to permit the core rods to be indexed between stations. Moreover, to index the core rods between stations, the turret also needs to be capable of being rotatably indexed.

In prior art molding machines it is a difficult and time-consuming operation to assemble and properly align the turret and its associated drive elements. For example, in a number of prior art systems it is quite difficult and time consuming to align the various components of the turret system so that the axially moveable and rotatable shaft carrying the turret is precisely aligned with the rotary drive unit, e.g., a Ferguson Indexing Unit, generally located in a position remote from the turret.

Representative prior art molding machines employing rotatable turrets are disclosed in U.S. Pat. Nos. 3,881,854, issued to Rainville; 3,887,316, issued to Hestehave; 4,162,879, issued to Makowski; 4,540,543, issued to Thomas, et al.; 4,604,258, issued to Valyi; 4,801,260, issued to Oles, et al.; 4,941,815, issued to Julian; 4,941,816, issued to Aoki, et al. and 4,946,367, issued to Nakamura.

U.S. Pat. No. 4,540,359 issued to Yamazaki, discloses an injection molding machine wherein a servomotor is employed to assist in controlling the operation of both a clamping mechanism and a plastics injection feed system. In particular, the device disclosed in the Yamazaki '359 patent includes transmission shafts 30 and 31, which are associated to be moved toward and away from each other through a clutch mechanism 32, and wherein a joint 33 is connected to the outer end of the clutch shaft 32B for connection to transmission shaft 30. The joint 33 and transmission shaft 30 are connected to a spline or key 34 forming part of the transmission shaft 30, to thereby permit relative axial movement between the shafts 30 and 31, while permitting joint rotational movement of these shafts by servomotor 40.

It should be apparent that the Yamazaki '359 patent does not disclose or relate in any way to a drive module employing an axially and rotatably moveable turret, wherein the rotational movement imparted to the turret is controlled by a motor.

OBJECTS OF THE INVENTION

It is a general object of this invention to provide a drive module for a machine which is reliable in operation and easy to assemble into the machine.

It is a more specific object of this invention to provide an index drive system for a molding machine which is reliable in operation and easy to assemble into the molding machine.

It is still a more specific object of this invention to provide an index drive module employing a rotatable turret and motor for driving the turret, which can be easily assembled, as a single unit, into a molding machine.

It is a further object of this invention to provide a drive module employing a rotatable and axially moveable turret, and a servomotor for rotatably driving the turret, wherein it is an easy operation to properly align the components of the module.

It is a further object of this invention to provide a drive module employing an axially and rotatably moveable turret and a motor for driving the turret, which is compact in construction and simple and reliable in operation.

SUMMARY OF THE INVENTION

The above and other objects of this invention are achieved in a drive module which is insertable as a unit into an aperture of a horizontal frame member of a machine. The drive module includes a turret adjacent an upper end thereof and a motor adjacent a lower end thereof. The turret includes elements of the machine thereon, e.g., core rods for a molding machine, which elements are required to be moved into different stations of the machine by the controlled (e.g., indexed)

rotation of the turret by the motor, about an axis of rotation of the turret. The motor for rotating the turret includes an upwardly directed output shaft which is in general axial alignment with the axis of rotation of the turret. The module includes an outer housing between the turret and the motor, and the output shaft of the motor is connected through a gear reducer to an inner housing which is disposed for rotational movement within the outer housing. An elongate shaft extends axially through the inner housing and is connected with the turret in a manner to transmit movement of the shaft to the turret. The module includes a force transmitting means connected to the inner housing and to the elongate shaft for transmitting rotational movement of the inner housing to the elongate shaft, and to permit axial movement of the elongate shaft relative to the force transmitting means and the inner housing. The module includes connection means for permitting easy attachment of the module to the horizontal frame member or to other suitable supporting framework of the molding machine.

In the preferred embodiment of this invention the drive module is an index drive module for a molding machine, and also in the preferred embodiment the motor is a servomotor which is controlled through a conventional encoder to incrementally index the output shaft, and thereby incrementally rotate the turret into different stations of the molding machine.

In the preferred embodiment of the invention the elongate shaft which is connected to the turret is a spline shaft, and the force transmitting means for transmitting rotational movement of the inner housing to the spline shaft includes a spline nut encircling the shaft and secured to the inner housing.

In the most preferred embodiment of the invention the force transmitting means includes upper and lower spline nuts which encircle the elongate spline shaft, with the upper spline nut being secured to an upper end of the inner housing and the lower spline nut being secured to a lower end of the inner housing.

Most preferably the spline shaft extends upwardly through the upper spline nut into an additional force transmitting member, e.g., preferably an additional spline nut, connected to the turret and to the spline shaft for transmitting the rotational motion of the spline shaft to the turret.

In the most preferred embodiment of this invention, the drive module is an index drive module that is part of an injection blow molding machine, and the elements carried on the turret are core rods for reception into cavities of an injection mold at one station, in which parisons are formed on the core rods, and into cavities in a blow mold at another station, in which the parisons are blown into shaped articles conforming to the configuration of the cavities in the blow mold, said motor of the index drive module being controlled to index the turret so that the core rods are sequentially indexed from the first station, after the injection molding operation, into the second station, for carrying out the blow molding operation.

BRIEF DESCRIPTION OF THE DRAWINGS

Other objects and many of the attendant advantages of this invention will be readily appreciated as the same becomes better understood by reference to the following detailed description when considered in connection with the accompanying drawings wherein.

DESCRIPTION OF THE PREFERRED EMBODIMENT OF THE INVENTION

Figure 3:
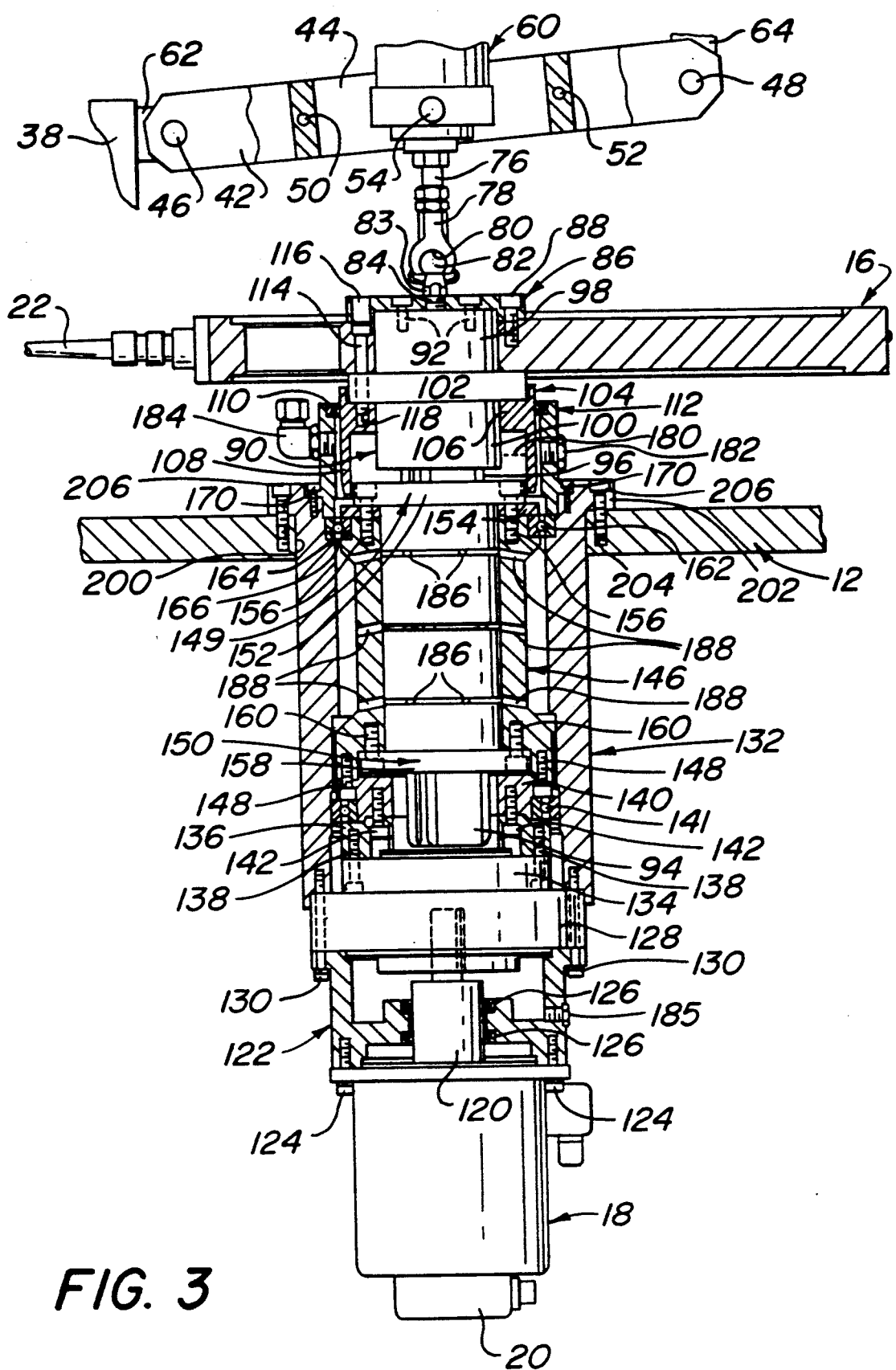
FIG. 3 is a view, partly in section, showing the details of construction of an index drive module embodying the present invention.

Referring now in greater detail to the various figures of the drawings wherein like reference characters refer to like parts, an index drive module embodying the present invention is generally shown at 10 in FIG. 3. The index drive module is attachable as a single unit to a table 12 or other horizontal support member of a molding machine 14, and employs an axially moveable and rotatably indexable turret or head 16, which is rotatably driven by an AC servomotor 18 through a conventional encoder 20. The encoder 20 controls the number of degrees of rotation of each indexed movement of the turret 16.

Figure 1:
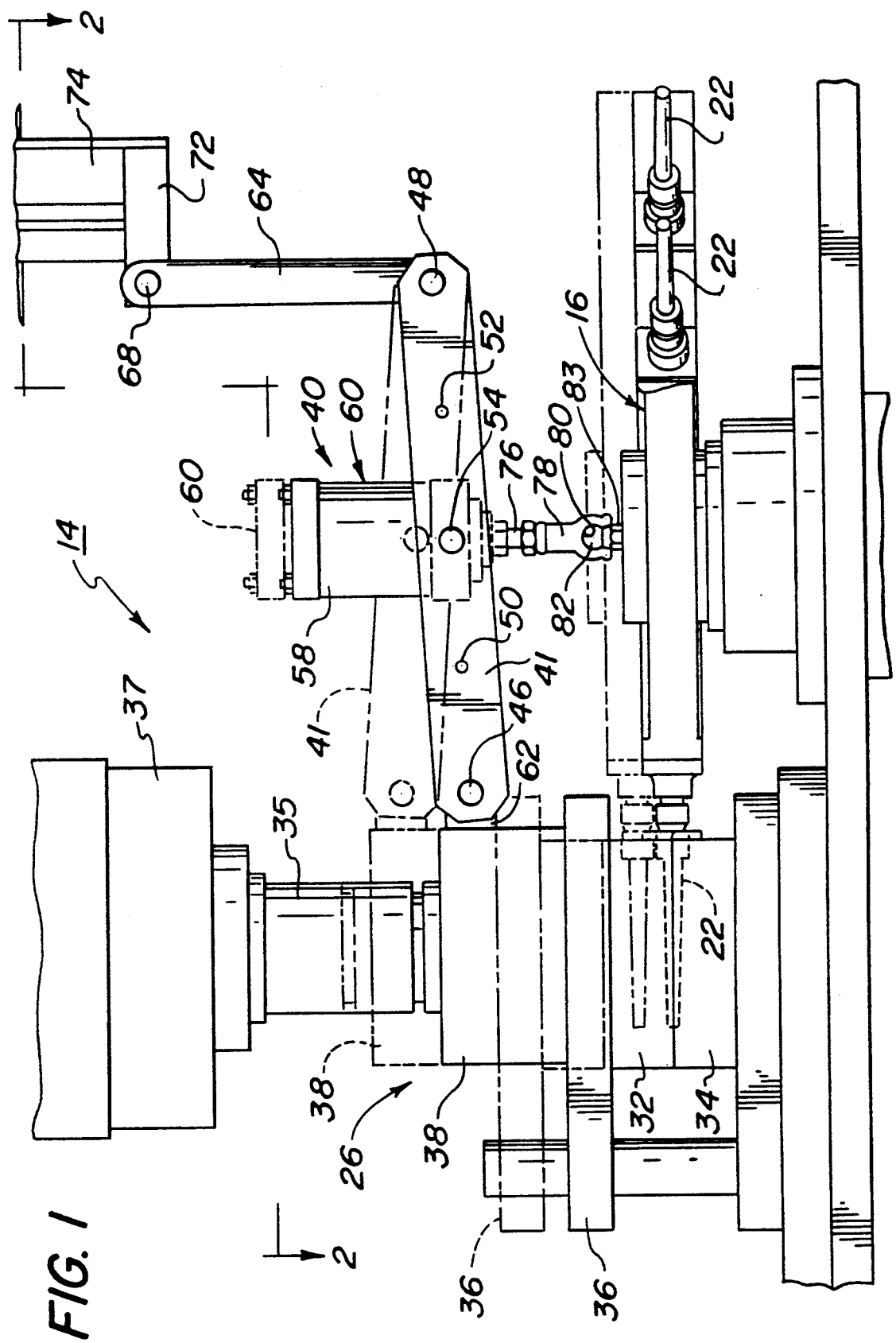
FIG. 1 is a fragmentary elevational view of an upper section of a molding machine, showing the assembly for axially moving the turret of the index drive module of this invention.
Figure 2:
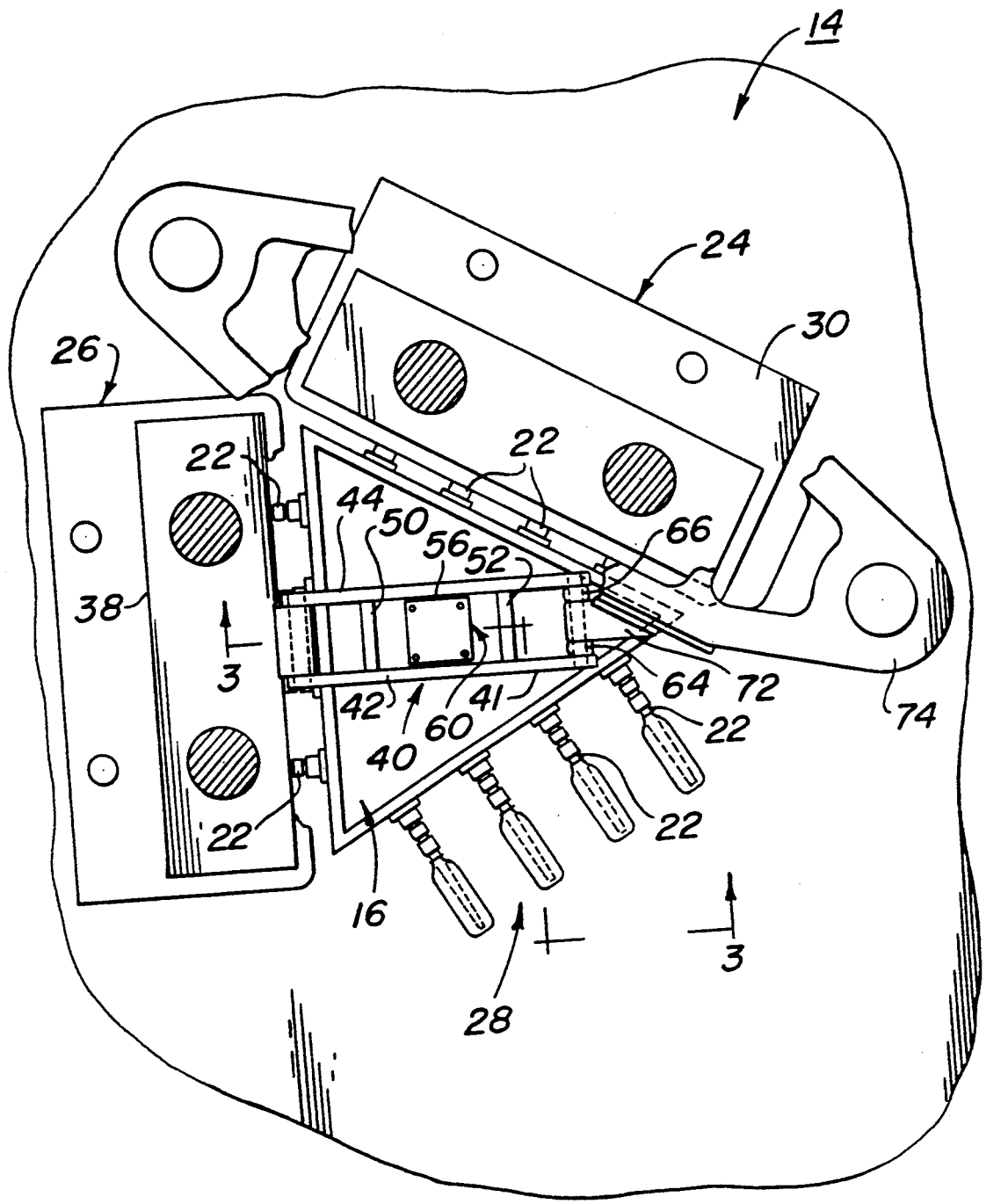
FIG. 2 is a sectional view taken along line 2—2 of FIG. 1.

Referring to FIGS. 1 and 2, a representative molding machine 14 in which the index drive module 10 of this invention is employed is a three-station injection-blow molding machine in which the turret 16 is triangular in plan view. A plurality of core rods 22, of a conventional construction, are spaced apart from each other on each of the three sides of the turret 16, as can be seen best in FIG. 2. These core rods include an interior passage that communicates with a source of pressurized gas (not shown) through the turret 16 during a blow molding operation to be described in greater detail later herein.

Referring specifically to FIG. 2, the turret 16 is indexable in 120 degree increments by the AC servomotor 18 and its associated encoder 20 to move the core rods 22 located on each of the three sides of the turret 16 sequentially from injection molding station 24 to a blow molding station 26, and finally to a stripping station 28. It should be understood that the number of degrees of rotation through which the turret 16 is moved in each indexed rotation is determined by the number and spacing of the stations in the machine into which elements carried by the turret are required to be moved.

The core rods 22 at the injection molding station 24 are disposed in a generally centered position within a closed, multi-cavity injection mold 30 during the injection molding operation. The injection mold 30 includes upper and lower mold sections (not shown), which are of a conventional construction, and which are very similar in construction to upper and lower mold sections 32 and 34 of a multi-cavity blow mold 36 (see FIG. 1).

At the injection molding station 24 extruded plastic material is directed into the multi-cavities of the closed injection mold 30, to thereby form a parison overlying and closely conforming to each of the core rods 22 disposed within the cavities of the injection mold. Thereafter, it is necessary to index the core rods 22 with the parisons thereon to blow molding station 26. To accomplish this it is necessary to first open the injection mold 30 and lift the turret 16 upwardly to move the core rods 22 carried thereby into an unobstructed free space between the mold sections of the injection mold. The turret 16 is then rotatably indexed through 120 degrees to move the core rods 22 with the parisons thereon into the unobstructed free space between open mold sections 32 and 34 of the blow mold 36, in vertical alignment with the cavities of the blow mold. This indexed motion also directs an adjacent upstream group of core rods 22 into the unobstructed free space between the open mold sections (not shown) of the injection mold 30. Thereafter, the mold sections 32 and 34 of the blow mold 36 and the mold sections of the injection mold 30 are simultaneously closed and clamped shut. Simultaneously with this mold closing and clamping operation the turret 16 and the core rods 22 thereon are lowered into the position they are required to occupy during subsequent blow molding and injection molding operations, respectively. In the blow molding station 26 pressurized gas (e.g., air) is directed through each of the core rods 22, to expand the parisons on the core rods into conformity with the walls of the cavities in the blow mold 36, to thereby form the parisons into the configuration of the desired article to be molded.

It should be understood that essentially the same mold closing, clamping and opening system is provided for both the injection mold 30 and the blow mold 36, with certain details of construction being shown herein only with respect to the blow mold 36. Specifically, as can be seen best in FIG. 1, a piston rod 35 is mounted for axially movement in a clamp cylinder 37. The distal end of the piston rod is attached to blow platen 38, which in turn is attached to the blow mold 36.

The system for controlling the movement of the piston rod 35 within the clamp cylinder 37 is described in detail in U.S. Pat. No. 5,261,810 filed on Sep. 16, 1992, and entitled "Closing and Clamping System", the subject matter of which is fully incorporated by reference herein.

It should be understood that the mold opening, closing and clamping system for the injection mold 30 and the blow mold 36 do not constitute a limitation on the broadest aspects of present invention; the present invention being embodied in the unique index drive module 10 of the molding machine 14, to be described in detail hereinafter. The purpose of the prior disclosure is to clearly set forth the preferred environment in which the index drive module 10 embodying the present invention is employed.

Referring to FIGS. 1 and 2, a lift assembly 40 for transmitting axial movement to the turret or head 16 of the index drive module 10 is shown in detail, and includes an elongate member 41 provided by a pair of elongate links 42 and 44. These elongate links 42 and 44 are spaced apart transversely from each other by pivot axles 46 and 48 disposed at the opposite distal ends of the links, by spacers 50 and 52 located inwardly from the pivot axles 46 and 48, respectively, and by pivot projections 54 and 56 extending outwardly from opposed side walls of outer housing 58 of an air cylinder 60.

As can be seen best in FIGS. 1 and 2, the pivot axle 46 is pivotally received within a passageway (not shown) which extends through a pivot block 62 that is fixedly secured against movement to the blow platen 38. Pivot axle 48 is pivotally secured to lower distal ends of transversely spaced apart generally vertically oriented links 64 and 66. A pivot axle 68 is provided at the opposite distal end of these latter links, and this pivot axle is rotatably received within a transversely extending passage of a mounting 72. The mounting 72 is fixedly secured against movement to injection crown 74 of the molding machine 14.

Referring to FIG. 1, the air cylinder 60 includes a piston rod (not shown) extending downwardly from a piston head (not shown) located within the outer housing 58 of said cylinder. The piston rod is rotatably connected through a turnbuckle 76 to a head 78 having a spherical opening 80 at the distal end thereof. This opening 80 rotatably receives a spherical head 82 of member 83. As can be seen best in FIGS. 1 and 3, the member 83 includes a downwardly extending threaded shaft 84 which is received within a threaded opening of a head-retaining cap 86 that, in turn, is secured to the turret 16 of the index drive module 10.

Referring specifically to FIG. 1, the manner in which the turret 16 of the index drive module 10 is moved axially upward, in response to the opening of the blow mold 36, will now be described. Specifically, when the blow platen 38 is moved upwardly to the position shown in phantom relationship in FIG. 1, by the system disclosed in detail in U.S. Pat. No. 5,261,810, the subject matter of which already has been incorporated by reference herein, the elongate member 41 is rotated in a generally clockwise direction about pivot axle 48, into the position illustrated in phantom representation in FIG. 1. This rotational movement is permitted to take place by the rotatable mounting of the elongate member 41 to pivot axle 48 carried on the pivotally movable links 64 and 66. This permits the necessary translatory movement of the elongate member 41 to take place as said elongate member is rotated between the position shown in solid representation (e.g., −5 degrees from the horizontal), when the blow mold 36 is closed, into the position shown in phantom representation (e.g., +5 degrees from the horizontal), when the blow mold is opened.

It should be noted that the air cylinder 60, by virtue of being mounted substantially midway between the pivot axles 46 and 48 associated with the elongate member 41, is moved vertically approximately one-half the distance of movement of the axle 46. It also should be understood that during automatic operation of the molding machine, the vertical movement imparted to the turret 16 is provided by the vertical movement of the air cylinder 60, without any relative movement between the housing 58 of the air cylinder and the piston rod therein. In fact, during automatic operation of the system, as described above, the piston head is maintained adjacent the upper end of the cylinder housing 58, and moves as a unit with the elongate link 41, as the link is moved by the opening and closing action imparted to the blow mold 36. The air retained in the cylinder housing 58 below the piston head functions as a cushion for the turret 16 and the elongate member 41, during the axially reciprocating movement of the turret which accompanies the opening and closing of the blow mold 36.

When it is desired to manually control the movement of the turret 16 of the molding machine 14, which is often desirable during set up of the molding machine to make sure that all elements are in proper alignment, the blow mold 36 is maintained in an opened condition, and the air cylinder 60 is then operated to provide the axial movement to the turret 16 and the core rods 22 attached thereto. It should be noted that this explanation regarding the manual operation of the molding machine 14 is provided for purposes of completeness, and does not constitute a limitation on the broadest aspects of the invention. However, it should be noted that during either automatic or manual operation of the molding machine 14, an arrangement is provided for axially moving the turret 16 of the index drive module 10 relative to its supporting frame structure e.g., table 12.

Before describing the specific details of the index drive module 10 embodying the present invention, it should be noted that the module is of a simple, reliable and compact construction, made up of certain elements which are bolted to the turret 16, both directly and indirectly, to move both axially and rotationally with the turret, and a number of other elements which rotate only, as a result of their direct or indirect connection to the AC servomotor 18. The rotational elements connected to the AC servomotor 18 transmit rotatable, indexed movement to the turret 16, through the elements which are fixed to the turret 16 to move both axially and rotationally therewith.

Turning specifically to FIG. 3, the index drive module 10 will be described in detail. The head retaining cap 86, in addition to being directly connected to, and fixed against relative rotation with respect to the turret 16 by circumferentially spaced-apart socket head cap screws 88 (only one of which is illustrated), also is directly connected to a spline shaft 96 by circumferentially spaced-apart socket head cap screws 92 (two of which are illustrated in FIG. 3), or other suitable fastening devices. The screws 92 extend into threaded openings through the upper surface of the spline shaft 96, to thereby provide a fixed, non-rotational connection between the head retaining cap 86 and the spline shaft 96.

A spline nut 90 is retained on the spline shaft 96 to both rotate and move axially as a unit with said spline shaft, through connections to be described in detail hereinafter. The preferred spline nut 90 utilized in this invention is sold under the designation THK #LBR100 CL, sold by THK Co., Ltd. of Tokyo, Japan. All references to "THK" products in this application refer to products acquired from this company.

It should be noted that the inner surface of the ball spline nut 90 includes a plurality of spherical balls (not shown) for cooperating with generally elongate, radially extending ears or ribs 94 of a vertically elongate spline shaft 96 (THK #100H Mod.). The cooperation of the ball spline nut 90 with the spline shaft 96 permits the transfer of rotary indexing motion from the spline shaft 96 to the turret 16 through the spline nut 90, as will be described in greater detail hereinafter.

Still referring to FIG. 3, the spline nut 90 includes an upper section 98, a lower section 100 and an intermediate annular flange section 102. An annular sealing ring or member 104 has an inner cylindrical surface 106 which conforms closely to the outer surface of the lower section 100 of spline nut 90. In addition, the sealing ring 104 includes an outer cylindrical surface 108 for closely engaging an annular oil seal member 110, which is included in a bearing retaining ring 112.

The annular sealing ring 104 is secured directly to the turret 16 by circumferentially spaced-apart socket head cap screws 114 (only one of which is shown in FIG. 3), which pass completely through enlarged openings 116 (only one of which is shown) in the head retaining cap 86. The threaded shafts of the screws 114 extend through non-threaded openings in the intermediate flange section 102 of the ball spline nut 90, and cooperate with threaded passages 118 in the annular sealing member 104. As a result of this connection the annular flange 102 of the spline nut 90 is tightly sandwiched between the turret 16 and the sealing member 104. Moreover, this connection causes the sealing member 104 to move axially as a unit with the turret 16, and also to rotate as a unit with said turret, when rotary motion is imparted to the turret through rotation of the spline shaft 96, as will be described in greater detail hereinafter.

However, it should be noted at this point that the elements of the index drive module 10 which are designed to rotate and move axially as a single unit with the turret 16 are the head retaining cap 86, the ball spline nut 90, the elongate spline shaft 96 and the annular sealing member 104.

Still referring to FIG. 3, the AC servomotor 18 of the index drive module 10 includes an upwardly extending output shaft (not shown), which is coupled in a conventional manner to a drive shaft or coupling 120 that rotates with the output shaft at the high RPM generated by the AC servomotor. It should be noted that the motor 18 is secured to a motor mounting flange member 122 of the index drive module 10, through circumferentially spaced-apart socket head cap screws 124, or other suitable fastening means. As can be seen best in FIG. 3, the motor mounting flange section 122 includes a pair of annular seals 126, which closely engage the rotating drive shaft or coupling 120 to prevent oil within the module 10 from getting into and damaging the servomotor 18.

Still referring to FIG. 3, the drive shaft 120 communicates with a gear reducing box 128, which, in an exemplary embodiment wherein the coupling 120 is driven at approximately 1200 r.p.m., reduces the speed by a ratio of 29:1. At this reduced speed the turret 16 is indexed 120 degrees, from one station to the next adjacent station, in approximately one-half ($\frac{1}{2}$) second.

Circumferentially spaced apart socket head cap screws 130 (two of which are shown in FIG. 3), or other suitable fastening means, pass through openings in the flange member 122 and the housing of the gear box 128, into threaded passages extending upwardly into a lower surface of outer, stationary, housing 132. This arrangement secures the gear box 128 in its proper position in vertical alignment with the rotary axis of the turret 16. In other words, the arrangement for interconnecting the motor mounting flange section 122, the servomotor 18, the gear box 128 and the outer, stationary housing 132 provides an effective interconnected system for establishing the proper orientation among these latter-mentioned members of the module 10. Still referring to FIG. 3, the gear box 128 includes an output flange 134 which rotates at the reduced speed. This output flange 134 is connected to a gear box flange 136 through circumferentially spaced apart socket head cap screws 138 (two of which are illustrated in FIG. 3), or other suitable fastening means.

The gear box flange 136 is connected, in turn, to a drive flange 140 through circumferentially spaced apart socket head cap screws 142 (two of which are shown in FIG. 3), or other suitable fastening means. This drive flange 140 is rotatably supported in the outer stationary housing 132 through a cross roller bearing 141 (THK #RE-20025 CO P6).

Still referring to FIG. 3, the rotatably mounted drive flange 140 is secured to inner spline nut housing 146 by circumferentially spaced apart socket head cap screws 148 (only two of which are shown), or other suitable fastening means, to thereby provide a rotational force transmitting connection between the drive flange 140 and the inner spline nut housing 146. In other words, through the interconnection of the socket head cap screws 148, the spline nut housing 146 will be rotated at the same rotational speed as the drive flange 140.

Still referring to FIG. 3, identical upper and lower ball spline nuts (THK #LBF100 CL) 149 and 150, respectively are secured to the inner spline nut housing 146 to rotate with said inner housing. Specifically, the upper ball spline nut 149 includes an annular flange 152 secured through an interposed spacer ring 154 to the upper end of inner spline nut housing 146, by circumferentially spaced apart socket head cap screws 156 (two of which are shown), or other suitable fastening means. In a similar manner an annular flange 158 of lower ball spline nut 150 is secured to a lower end of the inner spline nut housing 146 through circumferentially spaced apart socket head cap screws 160 (two of which are shown in FIG. 3) or other suitable fastening means. As should be readily apparent both the upper and lower spline nuts 149 and 150 rotate as a single unit with the inner spline nut housing 146, and cooperate with the spline shaft 96 to impart rotary motion to said shaft.

Still referring to FIG. 3, a cross roller bearing (THK #RB-20025-CO P 6) 162 is retained between the outer housing 132 and the inner spline nut housing 146. Specifically, this bearing 162 is mounted in an annular recess 164 in the outer drive housing 132 and an annular recess 166 in the inner spline nut housing 146. The spacer ring 154, which is positioned between the upper surface of the spline nut housing 146 and the annular flange 152 of the upper ball spline nut 149 cooperates with the annular recess 166 to retain the bearing 162 in said recess. In a similar manner the bearing retaining ring 112 is secured to the outer drive housing 132 by circumferentially spaced apart socket head cap screws 170 (two of which are shown in FIG. 3), or other suitable fastening means, to assist in retaining a portion of the bearing 162 in the annular recess 164 of the outer housing 132.

Highly reliable, balanced rotation of the inner spline nut housing 146 within the outer drive housing 132 is established by the spaced apart bearings 141 and 162.

In summary, it should be noted that the servomotor 18, through operation of encoder 20, rotatably indexes the elongate spline shaft 96, through the rotatable drive connection provided between the motor 18 and the spline shaft 92 by gear box 128, output flange 134, gear box flange 136, drive flange 140, inner spline nut housing 146 and the ball spline nuts 149, 150, which are connected to rotate with the spline nut housing 146.

The turret 16 is rotatably indexed by virtue of being mounted to rotate as a unit with the spline shaft 96, by the connection of the turret 16 to the spline shaft 96 through head retaining cap 86 and the uppermost spline nut 90. In addition to being rotatable with the spline shaft 96, the turret 16 and its connected ball spline nut 90 and head retaining cap 86 are axially movable, as a single unit, through operation of the earlier-described lift assembly 40, without disengaging the rotary interconnection provided to the turret 16 through the AC servomotor 18.

In the most preferred construction of this invention the rotary components of the index drive module 10 are maintained in an bath of oil to establish a low friction system. Specifically, the interior region of the module is bathed in oil up to approximately oil line 180. Note that this upper oil level is at the approximate mid-point of a site glass 182, which is secured into the bearing retaining ring 112. The bearing retaining ring 112 also includes a fitting 184 through which the oil is directed into the interior region of the module. It should be noted that, solely for purposes of simplicity of illustration and explanation, the fitting 184 is shown in FIG. 3 circumferentially displaced from the position it actually occupies in the module 10. Also, to drain the oil from the interior of the module a drain fitting 185 is provided adjacent a lower region of the module.

It should be noted that the upper and lower ball spline nuts 149 and 150 include a plurality of oil passages 186 therein, only some of which are illustrated on the drawing. These passages are included in the nuts 149 and 150, as manufactured. In order to provide oil communication with the spline nuts 149 and 150, as well as with the elongate spline shaft 96, passageways 188 are provided through the peripheral wall of the inner spline nut housing 146. These passageways 188 preferably are directly aligned with the regions of the oil passages 186 in the spline nuts 149 and 150, to direct oil into said oil passages. Thus, oil being circulated between the inner, rotatably mounted spline nut housing 146 and the outer, stationary index housing 132 passes through passageways 188 in the spline nut housing and through the oil passages 186 in the upper and lower ball spline nuts 148 and 150, to thereby bathe the relatively moveable surfaces of the ball spline nuts and the spline shaft 96 in the circulating oil.

It also should be noted that the oil communicates with the motor coupling 120, the gear box 128, the output flange 134, the gear box flange 138, the drive flange 140 and the roller bearings 141 and 162. However, as described earlier in this application, the annular seals 126 closely surround the motor coupling 120 prevent oil from getting into, and damaging the servomotor 18.

As can be seen best in FIG. 3, the index drive module of this invention, as a single unit, is insertable downwardly through an aperture 200 provided in a supporting table 12 of the molding machine 14, with an annular flange 202 of the outer housing 132 overlying the upper surface of the support table 12. Moveover, the annular flange 202 is provided with circumferentially spaced apart openings (only two of which are shown in FIG. 3), and these openings are aligned with threaded passageways 204 extending inwardly into the support table 12. This arrangement permits the index drive module 10 to be connected to the table 12 through a plurality of circumferentially spaced apart socket head cap screws 206 (two of which are shown in FIG. 3), or other suitable fastening means.

A number of variations can be made to the system in accordance with the broadest aspects of this invention. For example, the module can be adapted for use in machines other than molding machines, wherein controlled rotation of a turret is desired or required. For some applications it may not be necessary to first axially move the turret before rotating it. In these latter cases the module of this invention can be designed for simultaneous axial and rotational movement.

Without further elaboration the foregoing will so fully illustrate our invention that others may, by applying current or future knowledge adopt the same for use under various conditions of service.

What is claimed as the invention is:

1. A drive module insertable as a unit into an aperture of a horizontal frame member of a molding machine, said drive module including:

a turret adjacent an upper end of the module and including elements of the machine thereon, said elements being moveable between different stations of the machine by the controlled rotation of the turret about an axis of rotation of said turret;

a motor adjacent the lower end of the module and including an upwardly directed output shaft which is in generally axial alignment with the axis of rotation of the turret;

an outer housing between the turret and motor;

the output shaft of the motor being connected to an inner housing disposed for rotation within said outer housing;

an elongate shaft extending axially through the inner housing and being connected with the turret to transmit movement of the shaft to the turret, force transmitting means connected to said inner housing and to the elongate shaft for transmitting rotational movement of the inner housing to the elongate shaft, and for permitting axial movement of the elongate shaft relative to the force transmitting means and the inner housing;

said module including connection means for attachment to the horizontal frame member of the molding machine.

2. The drive module of claim 1, wherein the module is an index drive module of a molding machine and the turret includes elements of the molding machine thereon.

3. The module of claim 1, wherein the motor is a servomotor for incrementally indexing the output shaft to incrementally index the turret.

4. The module of claim 1, wherein the elongate shaft is a spline shaft, and said force transmitting means includes a spline nut encircling said shaft and being secured to the inner housing.

5. The module of claim 1, including means for directing oil into the inner housing for lubricating the elongate shaft and the force transmitting means.

6. The module of claim 1, wherein the molding machine is an injection-blow molding machine and the elements on the turret are core rods for reception into an injection mold at one station, in which parisons are formed on the core rods, and into a blow mold at another station, in which the parisons are blown into shaped articles conforming to the configuration of cavities provided in the blow mold, said motor being controlled to index the turret so that the core rods are sequentially indexed first to said one station and then to said another station.

7. The module of claim 1, including bearing means between the inner housing and the outer housing for permitting the inner housing to be rotated relative to the outer housing through the motor.

8. The module of claim 1, wherein the elongate shaft is a spline shaft, and said force transmitting means includes upper and lower spline nuts encircling said spline shaft, with the upper spline nut being secured to an upper end of the inner housing and the lower spline nut being secured to a lower end of the inner housing.

9. The module of claim 8, including means for directing oil into the inner housing for lubricating the spline shaft and the spline nuts.

10. The module of claim 8, wherein said spline shaft extends upwardly through the upper spline nut into an additional force transmitting member connected to the turret and to the spline shaft, 11. The module of claim 10, wherein said additional force transmitting member is a spline nut connected to the turret and encircling the spline shaft.

* * * * *